US012780403B2

(12) United States Patent
Stadlmair et al.

(10) Patent No.: US 12,780,403 B2
(45) Date of Patent: Nov. 3, 2026

(54) METHOD FOR CONTROLLING AT LEAST ONE ROTOR OF A FLIGHT VEHICLE, CONTROL DATA PROVISION UNIT FOR A FLIGHT VEHICLE AND A FLIGHT VEHICLE HAVING AT LEAST ONE ROTOR

(71) Applicant: KOPTER GERMANY GMBH, Höhenkirchen-Siegertsbrunn (DE)

(72) Inventors: Nicolai Stadlmair, Munich (DE); Daniel Redmann, Munich (DE)

(73) Assignee: KOPTER GERMANY GMBH, Höhenkirchen-Siegertsbrunn (DE)

( * ) Notice: Subject to any disclaimer, the term of this patent is extended or adjusted under 35 U.S.C. 154(b) by 253 days.

(21) Appl. No.: 18/710,579

(22) PCT Filed: Oct. 17, 2022

(86) PCT No.: PCT/EP2022/078850
§ 371 (c)(1),
(2) Date: May 15, 2024

(87) PCT Pub. No.: WO2023/104382
PCT Pub. Date: Jun. 15, 2023

(65) Prior Publication Data

US 2026/0167320 A1 Jun. 18, 2026

(30) Foreign Application Priority Data

Dec. 9, 2021 (DE) .................... 10 2021 214 078.5

(51) Int. Cl.

| | |
|---|---|
| ***B64C 13/16*** | (2006.01) |
| ***B64C 27/06*** | (2006.01) |
| ***B64C 27/82*** | (2006.01) |
| ***B64D 31/16*** | (2024.01) |
| ***B64F 5/60*** | (2017.01) |
| ***G05D 1/611*** | (2024.01) |
| ***G05D 109/25*** | (2024.01) |

(52) U.S. Cl.
CPC .............. *B64C 13/16* (2013.01); *B64C 27/06* (2013.01); *B64C 27/82* (2013.01); *B64D 31/16* (2024.01);
(Continued)

(58) Field of Classification Search
None
See application file for complete search history.

(56) References Cited

U.S. PATENT DOCUMENTS 5,597,138 A * 1/1997 Arlton .................. B64C 27/467 416/223 R
6,171,056 B1 * 1/2001 Lorber .................. B64C 27/615 416/61
(Continued)

FOREIGN PATENT DOCUMENTS

DE 10 2008 046 486 A1 3/2010
DE 10 2018 212 769 A1 2/2020
(Continued)

OTHER PUBLICATIONS

International Search Report of PCT/EP2022/078850, Jan. 30, 2023, 4 pages.
(Continued)

*Primary Examiner* — Jennifer M Anda
(74) *Attorney, Agent, or Firm* — Womble Bond Dickinson (US) LLP

(57) ABSTRACT

A method for controlling at least one rotor (5) of a flight vehicle (1), wherein the rotor (5) is configured to compensate for or at least reduce a torque acting on the flight vehicle (1), the rotor (5) being provided with a shroud (15), and wherein a rotational speed of the rotor and an angle of attack of at least one rotor blade (20) of the rotor are adjustable for the rotor (5), in particular independently of a further rotor (3) provided on the flight vehicle (1), comprises the following
(Continued)

steps: determining (51) at least a first pair of operating parameter values and at least a second pair of operating parameter values of the rotor (5), which respectively specify different rotational speeds and angles of attack of the rotor at the same thrust value achieved thereby, determining (52) a first sound index for the first pair of operating parameter values and a second sound index for the second pair of operating parameter values, wherein the determining comprises measuring a sound value of the rotor (5) in a test arrangement, storing (53) the first and second sound indices with assignment to the respective pair of operating parameter values, and controlling (54) the rotor (5) during operation of the flight vehicle (1), with reference to the assignment stored in step c) and as a function of the at least first or second sound index to be selectively achieved, in accordance with the first pair of operating parameter values or the second pair of operating parameter values.

18 Claims, 7 Drawing Sheets

(52) U.S. Cl.
CPC ................ *B64F 5/60* (2017.01); *G05D 1/611* (2024.01); *B64C 2027/8209* (2013.01); *B64C 2027/8254* (2013.01); *G05D 2109/25* (2024.01)

(56) References Cited

U.S. PATENT DOCUMENTS

| | | | | |
|---|---|---|---|---|
| 9,663,236 | B1 * | 5/2017 | Shiosaki | B64C 11/20 |
| 2008/0269962 | A1 * | 10/2008 | Marze | B64C 27/001 701/3 |
| 2014/0321968 | A1 * | 10/2014 | Kreitmair-Steck | B64C 11/001 415/228 |
| 2021/0262414 | A1 | 8/2021 | Wollenberg | |
| 2022/0169377 | A1 * | 6/2022 | Bustamante | B64C 27/06 |
| 2023/0068624 | A1 * | 3/2023 | Redmann | B64C 27/82 |

FOREIGN PATENT DOCUMENTS

| | | | |
|---|---|---|---|
| DE | 10 2019 134 692 | A1 | 6/2021 |
| DE | 2020 201 417 | A1 | 8/2021 |
| WO | WO 2017/172402 | A1 | 1/2017 |
| WO | WO 2021/156077 | A1 | 8/2021 |

OTHER PUBLICATIONS

Stadlmair, et al., “Four-Step Simulation Toolchain to Assess the Effectivity of Noise Reduction Measures for Shrouded Tail-Rotors”, Proceedings of the 47th European Rotorcraft Forum (ERF), Sep. 2021, United Kingdom, 14 pages.

You, et al., “Aeroacoustic Analysis of a Helicopter Configuration With Ducted Tail Rotor”, 28th Congress of the International Council of the Aeronautical Sciences 2012, 13 pages.

* cited by examiner

| thrust value | "low tonality" mode | | "low total sound level" mode | | another mode | |
|---|---|---|---|---|---|---|
| | rotational speed | angle of attack of blade | rotational speed | angle of attack of blade | rotational speed | angle of attack of blade |
| $S_1$ = - 22 % | $N_{R,0}$ = 100 % | $\phi$ = -8.7 ° | $N_{R,+}$ = 115 % | $\phi$ = -7.3 ° | N = … % | $\phi$ = … ° |
| $S_2$ = 22 % | $N_{R,+}$ = 115 % | $\phi$ = 11.2 ° | $N_{R,+}$ = 115 % | $\phi$ = 11.2 ° | N = … % | $\phi$ = … ° |
| $S_3$ = 44 % | $N_{R,+}$ = 115 % | $\phi$ = 16.0 ° | $N_{R,0}$ = 115 % | $\phi$ = 16.0 ° | N = … % | $\phi$ = … ° |
| $S_4$ = 66 % | $N_{R,0}$ = 100 % | $\phi$ = 25.0 ° | $N_{R,0}$ = 100 % | $\phi$ = 25.0 ° | N = … % | $\phi$ = … ° |
| … | … | … | … | … | … | … |

Fig. 8

METHOD FOR CONTROLLING AT LEAST ONE ROTOR OF A FLIGHT VEHICLE, CONTROL DATA PROVISION UNIT FOR A FLIGHT VEHICLE AND A FLIGHT VEHICLE HAVING AT LEAST ONE ROTOR

CROSS-REFERENCE TO RELATED APPLICATION(S)

This application is a U.S. National Phase Patent Application of International Patent Application Number PCT/EP2022/078850, filed on Oct. 17, 2022, which claim priority to and the benefit of German Patent Application Number 10 2021 214 078.5, filed Dec. 9, 2021, the entire content of each of which is incorporated herein by reference.

The present invention relates to a method for controlling at least one rotor of a flight vehicle, a control data provision unit for a flight vehicle with at least one rotor, and such a flight vehicle.

An example of such a flight vehicle having at least one rotor is a helicopter comprising a main rotor and a tail rotor. The tail rotor of the helicopter can be designed with a shroud, i.e. as an encapsulated rotor. In this case, the rotor is provided in a shroud or rotor casing circumferentially radially surrounding the rotor, for example in the form of a hollow structure. This hollow structure can have various hollow chambers. The shroud also forms a flow channel extending in the axial direction of the rotor. The shroud can reduce the sound emission with regard to the total sound level or broadband sound, in particular in a radial direction to the rotor.

The sound emission of a shrouded rotor is generated, among other things, by the turbulence of the medium flowing in a gap provided between the shroud and the tips of the rotor blades. The sound generated in this way has predominantly discrete preferred frequencies, so that the sound emission of a shrouded rotor is generally dominated by tonal components, i.e. discrete components in the sound spectrum.

These individual tonal sound components are usually perceived as unpleasant by humans. Therefore, although the total emitted sound energy can be reduced by a shrouded rotor compared to a non-shrouded rotor, it is still perceived as unpleasant to the human ear due to the tonal components. This also applies to the sound emission of other flight vehicles with shrouded rotors, e.g. electrically powered flight vehicles such as air cabs, eVTOL (electric Vertical Take-Off and Landing aircraft) or drones.

Numerical simulations of the aerodynamics and acoustics of a rotor system are disclosed, for example, in the following documents:

Stadlmair, N.; Redmann, D., Hirsch, F., Zappek, V. (2021): "*Four-step Simulation Toolchain to Assess the Effectiveness of Noise Reduction Measures for Shrouded Tail-Rotors", Proceedings of the 47$^{th}$ European Rotorcraft Forum* (*ERF*), United Kingdom; and You, J., Thouault, N., Breitsamter, C., and Adams, N., (2012). "*Aeroacoustic analysis of a helicopter configuration with ducted tail rotor". 28th Congress of the International Council of the Aeronautical Sciences* 2012.

To reduce the sound emission of a shrouded rotor system, WO 2021/156077 A1 proposes a rotor casing having a region that is at least partially permeable to gas on its circumferential surface facing the rotor, which is also referred to as a liner. This configuration of the rotor casing, in conjunction with the hollow structure, can reduce at least certain frequencies in the sound spectrum.

Both any chambers of the hollow structure and their combination with a liner have a characteristic and frequency-dependent impedance. This generally results in a complex and non-trivial relationship between an (advancing)thrust generated by the rotor and a sound emission of the rotor.

For example, if the distance between the tips of the rotor blades and the shroud is reduced, the occurrence of turbulence in the medium flowing in the gap between the rotor blades and the shroud, known as blade tip vortices, can be reduced, thereby reducing sound generation. If, for example, the rate of rotational (rotational speed) of the rotor is reduced, the effective distance between the blade tips of the rotor blades and the shroud increases, as the radial dimensions of the rotor blades are slightly reduced due to the reduction in centrifugal force, i.e. the rotor blades "elongate" less, which can have a negative effect on the sound generation of the shrouded rotor within a certain rotational speed range due to an intensification of the blade tip vortices. If the rotational speed is increased, the opposite effect can occur. In addition to these effects of sound emission, there is also the impedance of the hollow structure, possibly in combination with a liner, which has certain preferred frequencies.

It is therefore an object of the present invention to provide an alternative or improved method for controlling at least one rotor of a flight vehicle and an alternative or improved control data provision unit for a flight vehicle having at least one rotor, with which a reduction in sound emission can be achieved, in particular taking into account the specific acoustic characteristics of a shrouded rotor.

This object is solved by a method according to claim 1, a control data provision unit according to claim 13 and a flight vehicle according to claim 14. Further features of the invention are given in the dependent claims. Herein, the method according to the invention can also be further developed by features of the control data provision unit and/or the flight vehicle and vice versa, and features of the control data provision unit and of the flight vehicle can also be used among one another for further development.

A method according to the invention serves to control at least one rotor of a flight vehicle, the rotor being configured to compensate for or at least reduce a torque acting on the flight vehicle, the rotor being provided with a shroud, and a rotational speed of the rotor and an angle of attack of at least one rotor blade of the rotor being adjustable for the rotor, in particular being adjustable independently of a further rotor provided on the flight vehicle. The method comprises the following steps:

(a) defining at least a first pair of operating parameter values and at least a second pair of operating parameter values of the rotor, which respectively specify different rotational speeds and angles of attack of the rotor at the same thrust value achieved thereby, (b) determining a first sound index for the first pair of operating parameter values and a second sound index for the second pair of operating parameter values, the determining comprising measuring a sound value of the rotor in a test arrangement, (c) storing the first and second sound indices with assignment to the respective pair of operating parameter values, and (d) controlling the rotor during operation of the flight vehicle, with reference to the assignment stored in step c) and as a function of the at least first or second sound index to be selectively achieved, in accordance with the first pair of operating parameter values or the second pair of operating parameter values.

Preferably, steps a) to c) are carried out in the method for more than two pairs of operating parameter values and corresponding sound indices, and/or for several thrust values to be achieved.

The flight vehicle can be a helicopter, for example. Alternatively, the flight vehicle can be another flight vehicle, such as an air cab, eVTOL (electric Vertical Take-Off and Landing aircraft) or a drone.

The rotor does not have to be used exclusively for torque compensation. For example, the rotor can also be configured to generate dynamic uplift and/or a horizontal movement of the flight vehicle in addition to the torque compensation.

Compensation or reduction of a torque acting on the flight vehicle is understood in particular to mean counteracting a rotation of the flight vehicle about its yaw axis (z-axis or vertical direction), which is generated in particular by another rotor provided on the flight vehicle, e.g. a main rotor of the flight vehicle. For this purpose, a horizontal thrust is generated by the rotor, for example, which counteracts the torque. For example, the rotor for torque compensation can be provided as a secondary rotor, in particular as a tail rotor, of the flight vehicle, which is provided, for example, on a tail boom of the flight vehicle, in particular of a helicopter.

The angle of attack of at least one rotor blade of the rotor can, for example, be individually adjustable for the rotor, i.e. independently of other rotor blades of the same rotor. However, the angle of attack of all rotor blades of the rotor can also be adjustable, in particular collectively adjustable, i.e. the same angle of attack is set for all rotor blades of the rotor at the same time. Such adjustability of the angle(s) of attack is preferably carried out separately for the rotor, i.e. independently of one or more other rotors provided on the flight vehicle and independently of any adjustability of the angle(s) of attack of rotor blades of this or these other rotors.

The shroud of the rotor preferably refers to a structure that surrounds the rotor circumferentially. Preferably, the shroud delimits an air duct of the rotor extending in the axial direction of an axis of rotation of the rotor. The shroud can, for example, have a cylindrical shape or the shape of a torus, in particular be designed as a cylindrical or torus-shaped housing. The shroud can also deviate from a cylindrical or torus shape and can be optimized in terms of its aerodynamic properties, for example. In general, the shroud can have any suitable shape. Such a shroud can, for example, reduce thrust losses due to turbulence at the blade tips of the propeller and increase safety. Alternatively or in addition, an additional, and in particular non-negligible, thrust can be generated by a flow through the duct or air duct formed by the shroud. Such an additional thrust can, for example, amount to 50% or more of a total thrust.

A sound value measured in step (b) can in particular be a sound pressure. Preferably, the sound value or sound pressure is measured with time resolution, for example using a measuring device, in particular one or more microphones. The sound value can, for example, also be a tonality and/or a total level of the sound emission of the rotor. The sound index determined from the sound value can, for example, be the measured sound value itself, or an index that takes into account, for example, taking into account several measured values, i.e. sound values, from different sound sensors or measuring devices and/or their relative position to each other or in relation to the rotor. In particular, the sound index can be determined from the measured sound value using a suitable data processing routine.

The determining of the sound index in the described method is carried out in particular by measuring a sound value, in particular a sound pressure, of the rotor in a test arrangement. The test arrangement can in particular comprise a test station, such as a component test station or individual component test station, in which, for example, the rotor is arranged as a component with any other components (e.g. the shroud). Such a component test station is configured in particular for carrying out acoustic measurements, for example using suitable measuring devices such as sound measuring devices. Alternatively or in addition, the test station can include a wind tunnel. Preferably, the measurement of a sound value of the rotor in step (b) is carried out on a test station, wherein at least one measuring device for recording the sound value is arranged at a predetermined position in relation to the position of the rotor in the test station.

This means that the method, which can serve in particular to reduce a sound emission of the flight vehicle, is not carried out during the flight operation of the flight vehicle itself, but instead respective data is recorded and evaluated in advance, i.e. in particular on the ground, in relation to the rotor. Thus, for example, characteristic maps are generated offline in the method, i.e. not during flight operation, and are therefore available before a real flight of the flight vehicle. The method therefore differs in particular from an adjustment-based method for reducing sound emissions, which is based on a change in control data during the flight based on measured values recorded during the flight. This means that no complex and/or expensive equipment such as microphones, loudspeakers, adaptive controllers, etc. are required on the flight vehicle.

Furthermore, no complex flight measurement campaigns for reference measurements are required to achieve a reduction in the sound emission of the flight vehicle. Rather, for example, the method described above can be carried out using measurements, in particular sweep measurements that are easy to perform, in a test environment such as a component test station. This also has the advantage that control data determined in the method, which is provided for controlling the rotor during flight operation of the flight vehicle, can be renewed or updated at any time if necessary, e.g. to add further optimization points, etc.

The adjustability, or individual adjustability, of the rotational speed and of the angle of attack of at least one rotor blade of the rotor can, for example, achieve an additional degree of freedom. For example, a substantially constant thrust can be achieved for different rotational speeds by adjusting the angle of attack of the blade, or vice versa. In particular, this means that a predetermined thrust value can be achieved by different combinations of the angle of attack of the blade and the rotational speed, also referred to as pairs of operating parameter values. The method described here can be used to select a pair of operating parameter values for a thrust value to be achieved in such a way that an improvement, in particular minimization, of a sound emission by the rotor, such as a secondary rotor, in particular the tail rotor, can be achieved during flight operation. The method also allows a complex acoustic characteristic of a shrouded rotor to be taken into account in a simple manner. In particular, for example, a frequency-dependent acoustic signature of the shrouded rotor can be advantageously applied by the method in such a way that the rotor is controlled during operation in such a way that the frequency-dependent damping properties of the shroud are utilized. Preferably, the rotor is therefore controlled in step (d) in such a way that frequencies of the sound emission of the rotor that are not preferably attenuated by the shroud are avoided. In other words, the rotor is controlled in step (d) in such a way that the rotor substantially generates a sound emission having frequencies that are attenuated by the shroud, preferably when a liner is used.

Preferably, the control of the at least one rotor according to step (d) takes place at least temporarily at a time when the flight vehicle is in hover flight. In particular, hovering is understood to be a state of the flight vehicle in which it remains in a substantially unchanged horizontal and vertical position. When the flight vehicle is hovering, for example, increased blade loads of the rotor may be required, which can be accompanied by a high tonal sound component, while at the same time the flight vehicle remains above the same position on the ground for a long time. It may therefore be particularly desirable to minimize the sound emission of the flight vehicle when hovering.

Preferably, in the method, the assignment in step c) comprises a graphical and/or tabular representation of the sound indices as a function of the rotational speeds and/or the angles of attack of the rotor and/or the thrust values achieved thereby. A graphical representation can, for example, be a representation of one or more functions or measurement curve(s). This can, for example, provide a simpler representation of the respective values and/or simplify an interpolation of measured values.

Preferably, the assignment stored in step c) is supplemented by further sound indices and/or pairs of operating parameter values and/or thrust values, which are determined in a numerical simulation and/or by interpolation. In particular, a numerical simulation can comprise a simulation of the aerodynamics of the rotor system (computational fluid dynamics, cfd) and/or a simulation of the acoustics (computational aeroacoustics, caa) of the rotor system. Such a simulation and/or interpolation can, for example, reduce the measurement effort. Examples of such numerical simulations are described in the documents mentioned at the beginning.

Preferably, in step d), the sound index on which the control of the rotor is based is selected such that a reduction in the sound emission of the rotor is achieved. For this purpose, for example, the rotor can be controlled in the test environment for a predetermined thrust to be achieved with different pairs of operating parameter values that generate the desired thrust and the corresponding sound indices can be determined. Accordingly, the pair of operating parameter values for which the smallest sound index was determined is then preferably selected for subsequent control of the rotor in flight mode. This makes it possible, for example, to reduce sound emissions in a simple manner.

Preferably, the sound indices comprise a tonality and/or a total level of sound emission of the rotor. By reducing the tonality, a sound generation caused by the flight vehicle during operation can appear less unpleasant to the human ear, for example. By reducing the total level, for example, the total volume of the sound emission can be reduced.

A tonality of the sound emission is preferably defined as the difference between a peak sound level and a broadband noise level of the sound emission. Preferably, the peak sound level is determined at a defined frequency of the measured frequency spectrum. For example, the defined frequency for the peak sound level can be a characteristic blade passing frequency of the at least one rotor blade or the rotor blades. These characteristic blade passing frequencies result, among other things, from the number of rotor blades, their angular distance from each other and the rotational speed of the rotor. However, the tonality can also take several frequencies into account. In this case, the arithmetic mean of the differences between the respective peak sound level and the broadband noise level is calculated for a number of frequencies. In particular, the arithmetic averaging can be limited to a predefined frequency range.

Preferably, the method is carried out using a rotor whose shroud is formed by a circumferential hollow structure with respect to an axis of rotation of the rotor, the hollow structure preferably having a region that is gas-permeable at least in sections thereof on its circumferential surface facing the rotor, the hollow structure further preferably being configured such that acoustic waves of at least one frequency penetrating into the hollow structure through the gas-permeable region are at least partially absorbed by the hollow structure. The rotor and its shroud are also referred to as a rotor system. The gas-permeable region, e.g. a sectional microperforation of a surface of the shroud, is also referred to as a liner and can, for example, cause rotor blade tip vortices generated by the rotation of the rotor to be introduced into the hollow structure of the shroud. In particular, this configuration of the shroud can achieve a frequency-dependent damping of the rotor's sound emission. The method described proves to be particularly advantageous for such a rotor system, as the method can be used to specifically select those pairs of operating parameter values whose sound generation during operation of the rotor can be attenuated particularly well by the shroud.

Preferably, the flight vehicle is designed as a helicopter and the rotor is a secondary rotor configured for torque compensation and control about a yaw axis, further preferably a tail rotor of the helicopter, wherein further preferably the helicopter comprises a separate drive, in particular an electric motor, which is configured to set the secondary rotor in rotation according to a predetermined rotational speed. By providing a separate drive for the secondary rotor, in particular the tail rotor, the rotational speed of the rotor can, for example, be adjusted separately in a simple manner.

Preferably, the rotor is a first rotor of the flight vehicle and the flight vehicle comprises at least a second rotor configured to compensate for or at least reduce a torque acting on the flight vehicle, the second rotor being provided with a shroud, and a rotational speed of the second rotor and an angle of attack of at least one rotor blade of the second rotor, preferably a uniform angle of attack of all rotor blades of the second rotor, is adjustable for the second rotor independently of the first rotor, and wherein preferably steps a) to d) are carried out separately for the first and the at least second rotor or by measuring a total sound value of the at least two rotors. In other words, the present invention is also applicable to flight vehicles with several shrouded rotors, also referred to as multi-rotor systems. The use of several shrouded rotors can, for example, provide an additional degree of freedom for reducing sound emissions, since there are, for example, several possibilities for combining the individually controllable rotors.

According to the present invention, a control data provision unit is provided for a flight vehicle having at least one rotor, the rotor being configured to compensate for or at least reduce a torque acting on the flight vehicle, the rotor being provided with a shroud, and a rotational speed of the rotor and an angle of attack of at least one rotor blade of the rotor being adjustable for the rotor, in particular independently of a further rotor provided on the flight vehicle. The control data provision unit comprises (a) a defining unit for defining at least a first pair of operating parameter values and at least a second pair of operating parameter values of the rotor, which respectively specify different rotational speeds and angles of attack of the rotor at the same thrust value achieved thereby, (b) a determination unit for determining a first sound index for the first pair of operating parameter values and a second sound index for the second pair of operating parameter values, wherein the determining comprises measuring a sound value of the rotor in a test arrangement, (c) a memory unit for storing the first and second sound indices with assignment to the respective pair of operating parameter values, and (d) an output unit for outputting control data for controlling the rotor during operation of the flight vehicle, the control data specifying, with reference to the assignment stored in the memory unit and as a function of the at least first or second sound index to be selectively obtained, the control of the rotor in accordance with the first pair of operating parameter values or the second pair of operating parameter values.

With such a control data provision unit, for example, the same effects and advantages can be achieved as with the method described above.

A flight vehicle according to the present invention comprises at least one rotor configured to compensate for or at least reduce a torque acting on the flight vehicle, the rotor being provided with a shroud, and a rotational speed of the rotor and an angle of attack of at least one rotor blade of the rotor being adjustable for the rotor, in particular independently of a further rotor provided on the flight vehicle. Furthermore, the flight vehicle has a control unit which controls the at least one rotor during operation of the flight vehicle at least temporarily using control data provided by a control data provision unit according to the invention and/or controls it according to step (d) of a method according to the invention. Preferably, the at least one rotor is controlled at least during hover flight of the flight vehicle using control data provided by the control data provision unit and/or in accordance with step (d).

Further features and expediencies of the invention are described below also based on an exemplary embodiment with reference to the drawings.

Figure 3:
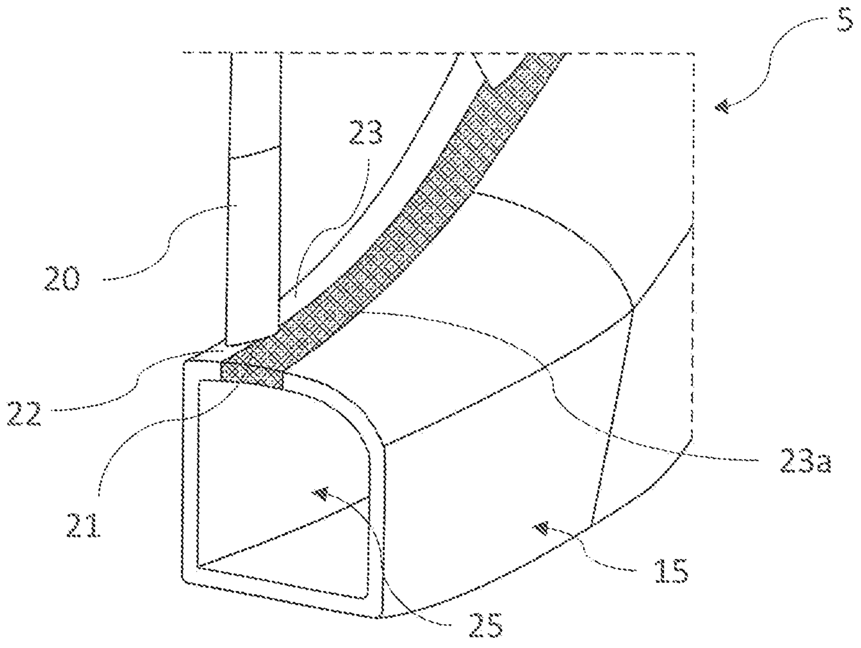
FIG. 3 is a schematic, perspective view, partially shown in cross-section, of a portion of the shroud shown in FIGS. 1 and 2 and of a rotor blade.
Figure 4:
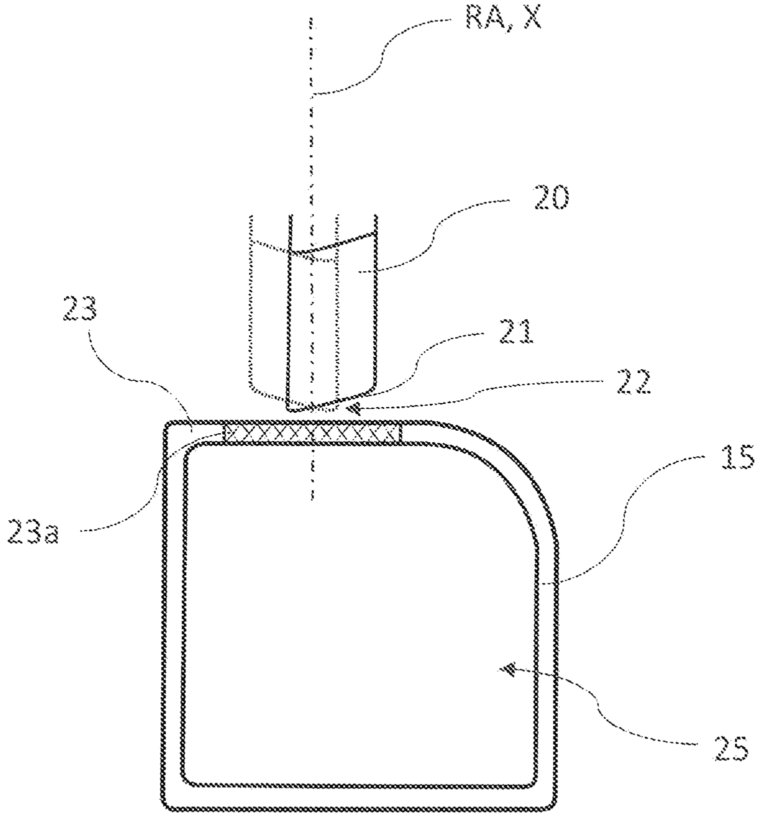
FIG. 4 is a schematic view of the shroud shown in FIGS. 1 to 3 and a section of a rotor blade shown in cross-section.
Figure 5:
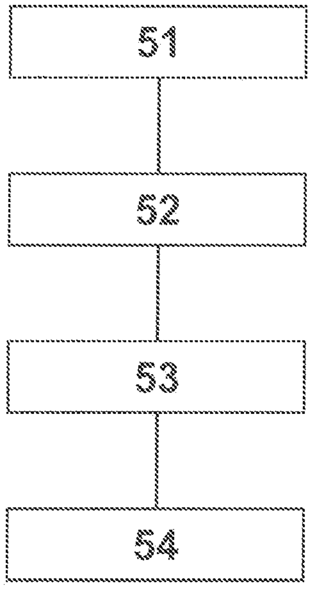
Figure 6:
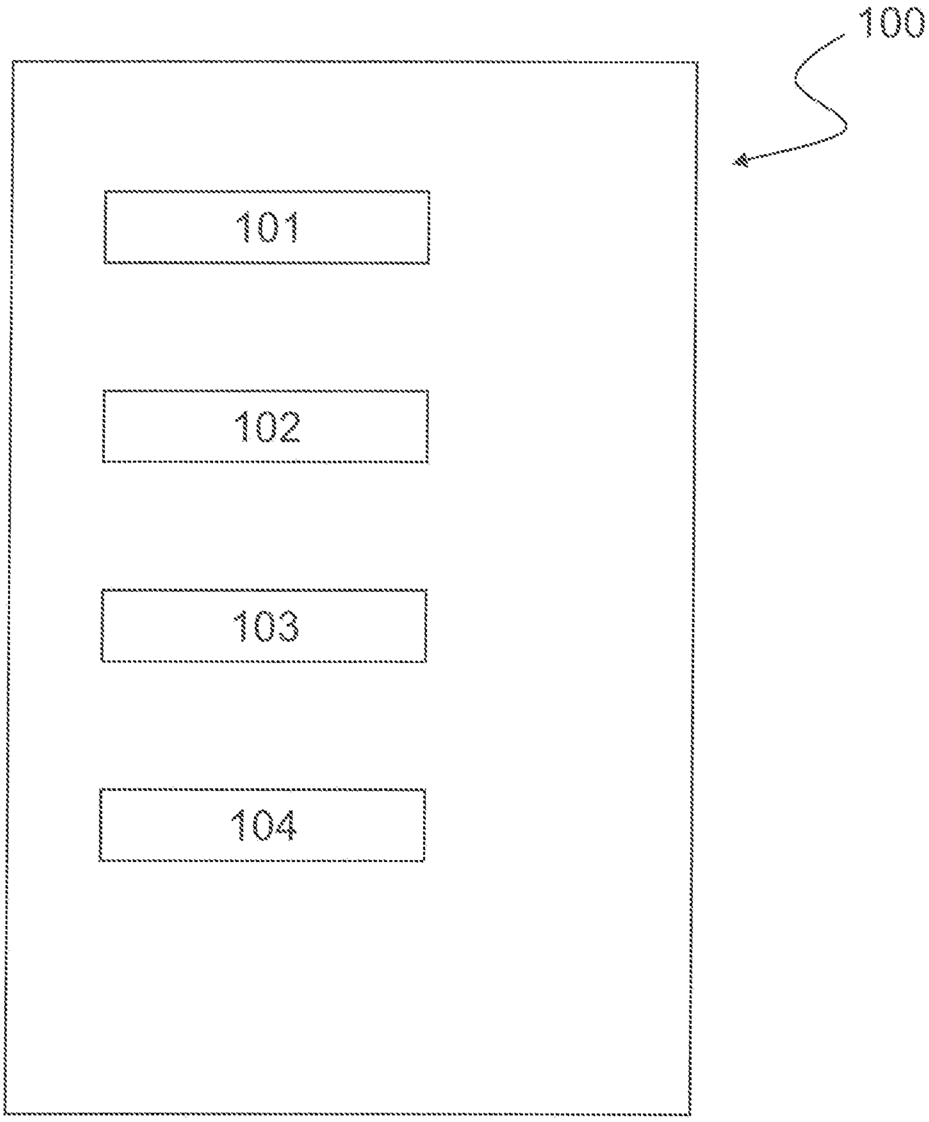
Figure 7A:
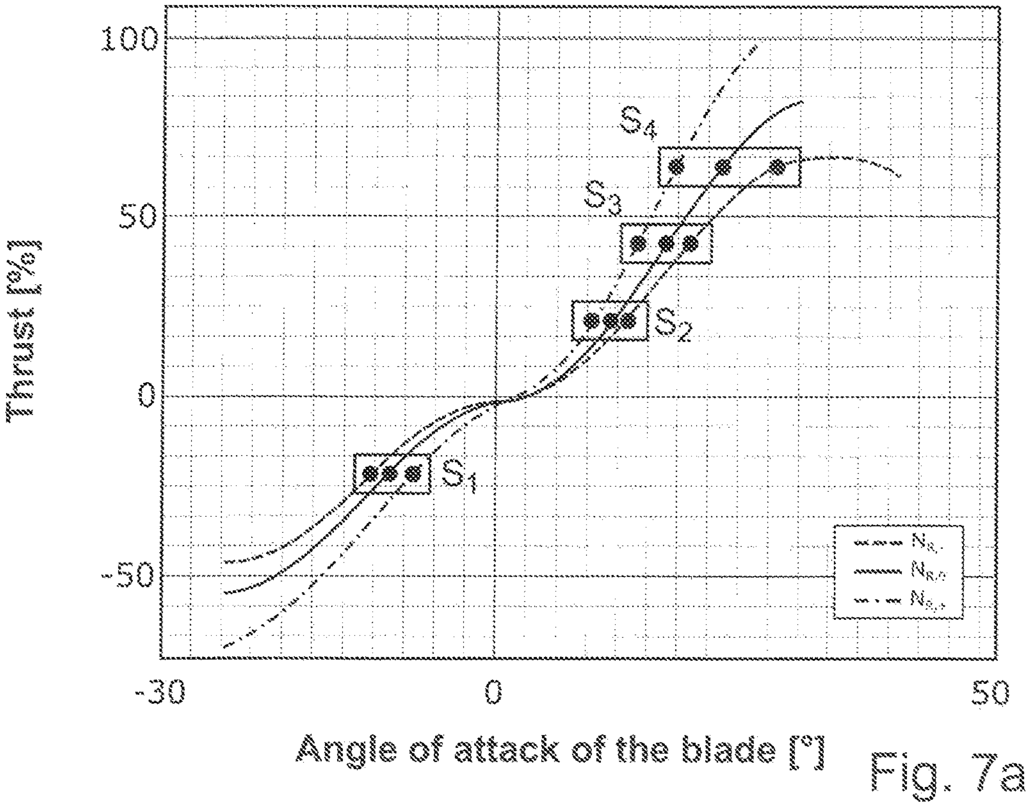
Figure 7B:
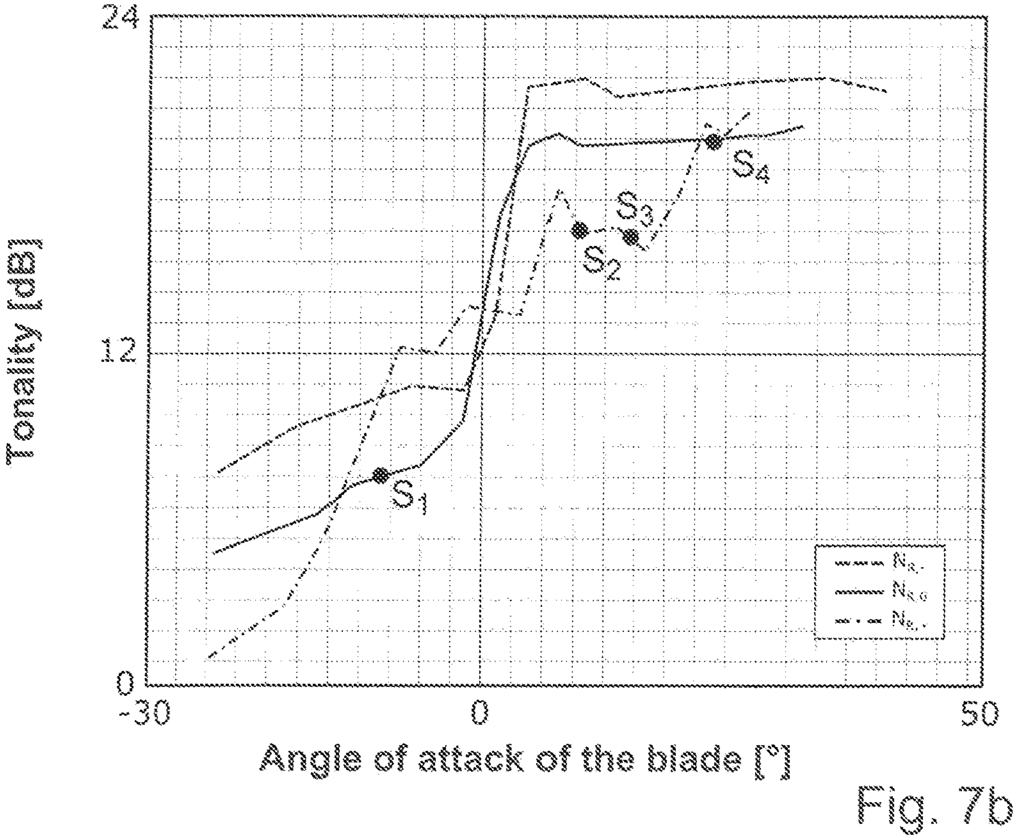
Figure 7C:
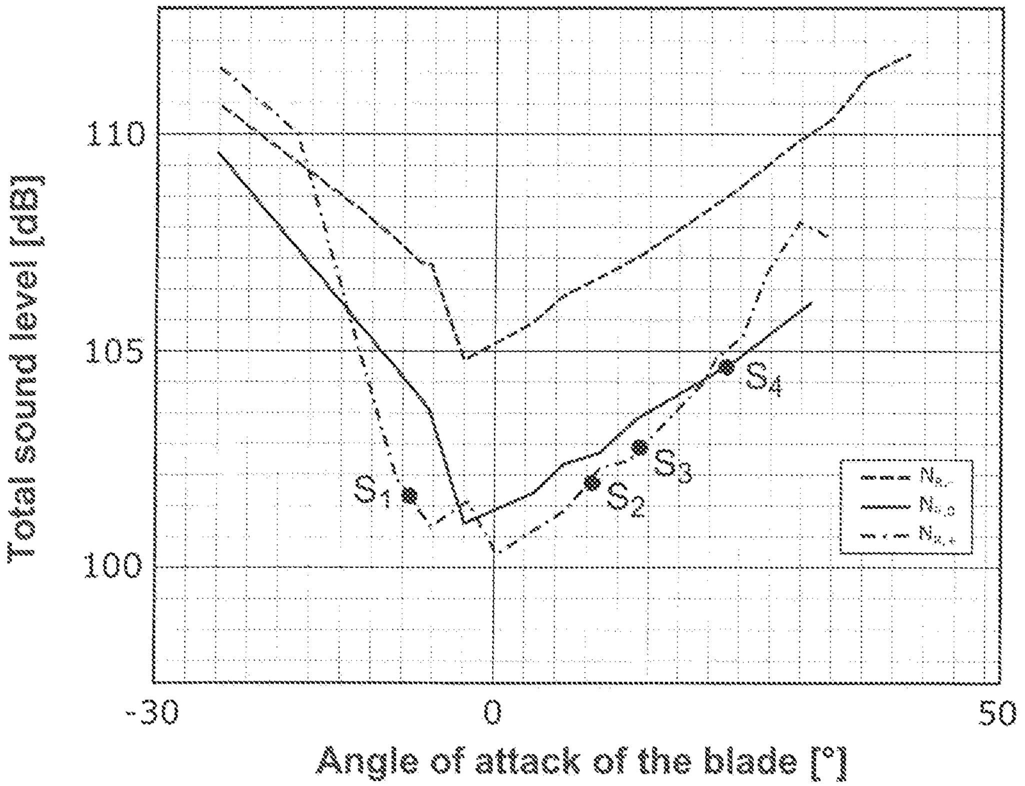

FIG. 5 is a schematic representation of a method according to the invention using a rotor shown in FIGS. 1 to 4, and FIG. 6 is a schematic representation of a control data provision unit according to the present invention, FIGS. 7*a* to 7*c* are schematic, exemplary diagrams generated by a method shown in FIG. 5, and FIG. 8 is a schematic, exemplary table, which was created based on the diagrams shown in FIGS. 7*a* to 7*c* and can be used to control the flight vehicle shown in FIGS. 1 to 4.

In the following, with reference to FIGS. 1 to 4, a flight vehicle is described which is suitable for carrying out a method according to the invention and for use with a control data provision unit according to the invention. The flight vehicle shown in the figures is a helicopter 1. The helicopter 1 shown in FIG. 1 comprises a fuselage 2 with a main rotor 3, and a tail boom 4 on which a tail rotor 5 is provided. The tail rotor 5 is provided with a shroud 15 which circumferentially surrounds the tail rotor. The main rotor 3 substantially serves to generate a dynamic uplift and possibly a horizontal movement of the helicopter 1, and the tail rotor 5 serves at least to compensate for a torque acting on the fuselage 2, in particular to compensate for a counter-torque generated by the main rotor 3, which would cause the fuselage 2 to rotate in the opposite direction to the rotation of the main rotor.

Figure 1:
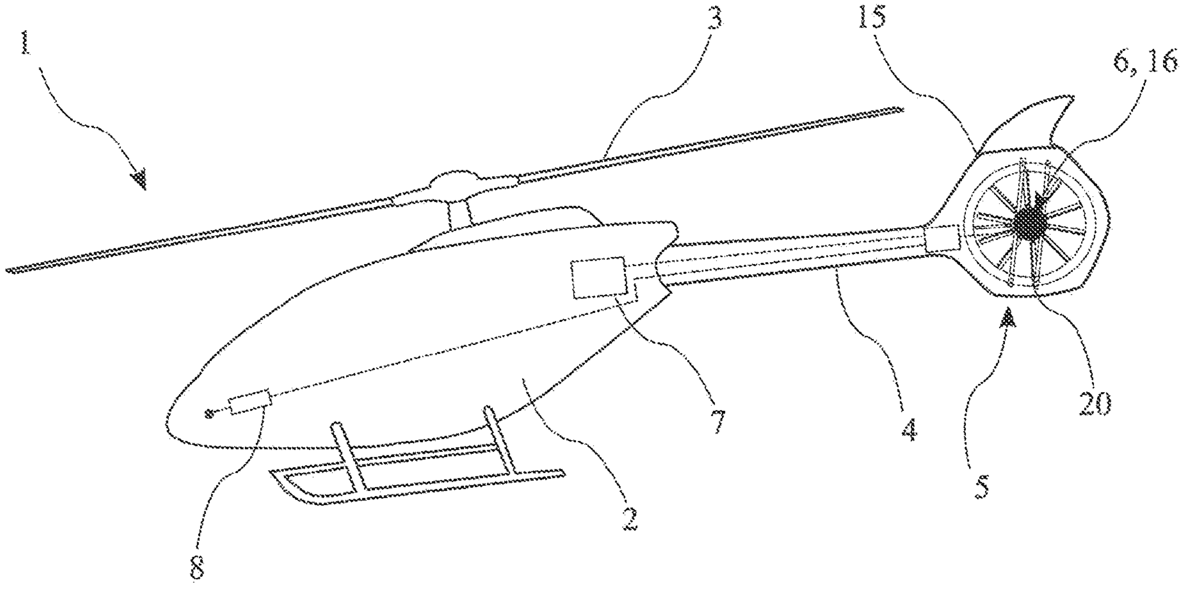
FIG. 1 is a schematic view of a flight vehicle having a rotor that is suitable for carrying out a method according to the invention and for use with a control data provision unit according to the invention.

Furthermore, the tail rotor 5 can be driven independently of the main rotor 3, i.e. is not coupled to the main rotor, in particular not mechanically coupled to it. For this purpose, the helicopter 1 shown in FIG. 1 comprises a drive 6, in particular an electric motor, which is configured to cause the tail rotor 5 to rotate at a predetermined rotational speed. In FIG. 1, the drive 6 is provided on or in a rotor hub 16 of the tail rotor 5. Alternatively, the drive 6 can also be provided at a location on the helicopter 1 other than the rotation hub, in which case a drive force from the drive 6 is then transmitted to the tail rotor 5. In the embodiment of FIG. 5, the helicopter 1 also has an energy storage 7, here in the form of a battery, which supplies the drive 6 with energy, in particular electrical energy.

The helicopter 1 also has a control unit 8 with which the individual components of the helicopter, in particular the drive 6 of the tail rotor 5 and a drive of the main rotor 3 not shown in the figures, can be controlled in a coordinated manner, as indicated by an arrow in FIG. 1. In particular, the control unit can specify a rotational speed of the tail rotor 5 and angles of attack of the blades for the tail rotor 5 (see below). In the present application, the term "control unit" refers to a computerized control which is configured to control the operation of the helicopter or one or more components of the helicopter. For this purpose, the control unit 8 can, for example, comprise a processor, a memory and an output interface. For example, the control unit 8 can be a computer. The control unit can, for example, include a central processor (CPU) whose operation is controlled by a computer program (software). The computer program can be stored separately from the control unit on a storage medium or a server from which it can be loaded into the control unit 8, and/or the computer program can be loaded into the control unit 8 via a network, for example the Internet.

Figure 2:
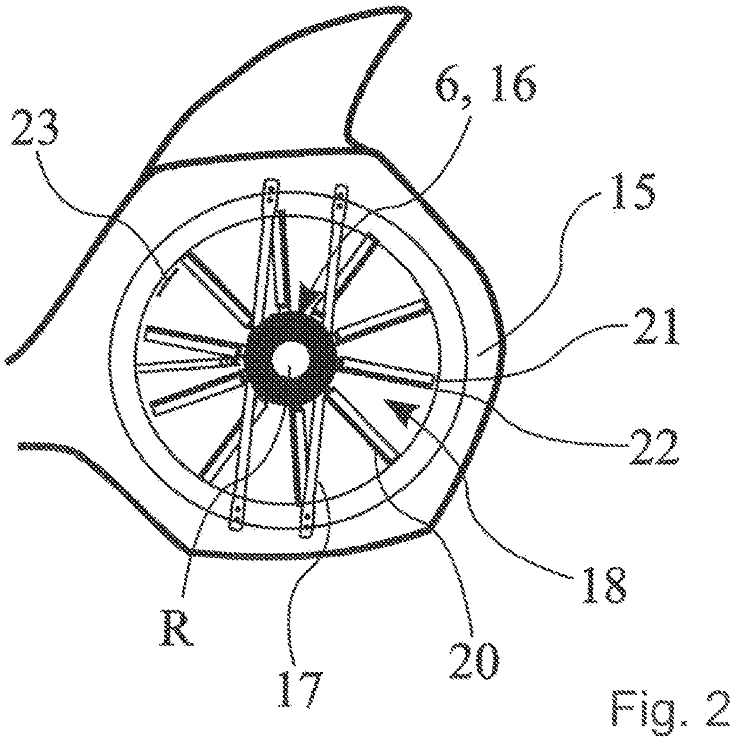
FIG. 2 is a schematic, perspective view of the rotor shown in FIG. 1.

The tail rotor 5 is described in more detail below with reference to FIGS. 2 to 4. The tail rotor 5 comprises several rotor blades 20, which are arranged around the rotor hub 16 and extend radially from the rotor hub 16 in the direction of the shroud 15. A radial extension of the rotor blades 20 is dimensioned such that the ends of the rotor blades 20 facing the shroud 15, which are also referred to as rotor blade tips 21, are provided at a distance from the shroud 15. Thus, a gap 22 is provided between the rotor blade tips 21 and the shroud 15, which is also referred to as the blade tip clearance. The rotor hub 16 is preferably held by several support struts or stators 17 and is rotatable about an axis of rotation R, which in FIG. 2 extends perpendicular to the plane of the drawing.

The shroud 15 surrounds the tail rotor 5 in the direction of rotation with respect to the axis of rotation R and delimits an air duct 18 of the tail rotor 5 extending in the axial direction of the axis of rotation R. As can also be seen from FIGS. 3 and 4, in the rotor plane RA formed by the rotor blades 20 perpendicular to the axis of rotation R, the circumferential surface 23 of the shroud 15 facing the tail rotor 5 has a gas-permeable region 23*a*, which is intersected by the rotor plane RA and extends axially to both sides of the rotor plane RA with respect to the axis of rotation R. For example, the gas-permeable region 23*a* can be formed by a perforated plate having microperforations, which is inserted and fixed in the shroud 15. The porosity introduced by the microperforation is, for example, 50% and is preferably constant in the circumferential direction and in the axial direction in relation to the axis of rotation R. The gas-permeable region 23*a* covers the radial projection of the rotor blade tips 21 of the rotor blades 20, so that rotor blade tip vortices generated in the gap 22 between the rotor blade tips 21 and the gas-permeable region 23*a* can be introduced through the gas-permeable region 23*a* into a hollow structure 25 formed by the shroud 15.

As an alternative to the configuration of the shroud 15 described above, the shroud can also be designed without the gas-permeable region 23*a*. The shroud 15 can also not form a hollow structure, but can be formed as a continuous body, for example.

As shown schematically in FIG. 4, the angles of attack of the rotor blades 20 of the tail rotor 5 are variable or adjustable. The adjustability of the angles of attack can be realized, for example, by a separately provided drive for the angles of attack of the blades (not shown in the figures) and corresponding control by the control unit 8. The angle of attack of a rotor blade 20 is changed by rotating the rotor blade 20 about a radial axis X, which extends perpendicular to the axis of rotation R of the tail rotor 5. FIG. 4 shows schematically with a solid line a rotor blade at a first angle of attack, and with a dashed line the same rotor blade 20 at a second angle of attack, which differs from the first angle of attack.

By combining the adjustability of the angle of attack of the blades and the rotational speed of the tail rotor 5, an additional degree of freedom can be achieved compared to tail rotors whose operation is coupled to the rotation of the main rotor. For example, this combination can be used to achieve a substantially constant thrust for different rotational speeds by adjusting the angle of attack of the blades, or vice versa. In other words, a predetermined thrust value can be achieved by different combinations of angle of attack of the blades and rotational speed, also referred to below as a pair of operating parameter values. The selection of a pair of operating parameter values is made for a thrust value to be achieved in such a way that an improvement, in particular minimization, of a sound emission by the tail rotor 5 is achieved, as described in more detail below.

Optionally, the hollow structure 25 formed by the shroud 15 can have stiffening elements and/or hollow structure elements not shown in the figures, which may, for example, serve as covers and whose dimensions and positioning may also influence the attenuation of acoustic waves introduced into the hollow structure or propagating therein, and/or which form chambers in the hollow structure 25, for example in order to form locally different resonator volumes in each case and thereby influence the attenuation of frequencies.

In the following, with reference to FIGS. 5 to 8, an exemplary embodiment of a method according to the invention for controlling the tail rotor 5 and a control data provision unit according to the invention is described.

The control data provision unit 100 shown in FIG. 6 is provided outside the helicopter 1 in order to carry out the method shown in FIG. 5. Here, the helicopter 1 or at least its tail rotor 5 is arranged in a test environment, for example on or in a test station. The test environment comprises one or more sound sensors or measuring devices for recording the sound pressure, e.g. in the time range, which are arranged at predetermined positions in relation to the position of the tail rotor in the test station. The sound sensor(s) or measuring device(s) are configured for measuring a sound pressure emitted by the tail rotor 5 in the test environment, e.g. as one or more microphones. The temporal resolution (sampling rate) of the sound pressure must be selected so that all relevant frequencies of the acoustic signal can be resolved. A downstream data processing routine (post-processing) can be used to subsequently determine the desired sound indices from the measured signal. A sound index can be, for example, a tonality or a total level of the sound emission of the tail rotor 5.

The control data providing unit 100 comprises a defining unit 101 which, in a first step 51, defines at least two different pairs of operating parameter values, each comprising a rotational speed and an angle of attack of the blade(s) of the tail rotor for the same value of the thereby generated thrust of the tail rotor. Preferably, more than two different pairs of operating parameter values are defined, as well as respective pairs of operating parameter values for different thrust values.

Subsequently, in a second step 52, the tail rotor 5 is controlled in the test environment according to the respective pairs of operating parameter values and the sound pressure for the respective operating state is measured by the at least one or more sound sensors or measuring devices. A sound index, for example a tonality or a total level of the sound emission of the tail rotor 5, is then determined from the measured sound pressure for the respective pair of operating parameter values in the test arrangement. Based on the measured sound emissions and the sound indices derived from them, a determination unit 102 of the control data provision unit 100 then determines a sound index for each pair of operating parameter values. This can be the sound index itself, or an index which takes into account, for example, several measured values from different sound sensors or measuring devices and/or their relative position to one another or in relation to the tail rotor.

For this purpose, for example, the parameters thrust, rotational speed and angle(s) of attack of the blade(s) of the tail rotor 5 can be run through in the test environment and the respective sound emissions measured. Such a procedure is shown purely as an example by means of the measurement curves in FIG. 7*a* to 7*c*.

FIG. 7*a* shows the thrust (ordinate axis in FIG. 7*a*) as a function of the angle of attack (abscissa axis in FIG. 7*a*) for three different values of the rotational speed. In other words, the diagram shown in FIG. 7*a* is obtained by changing the angle of attack of the blade on the tail rotor at a constant rotational speed and measuring the thrust as a function of the angle of attack of the blade. In FIG. 7*a*, as in FIG. 7*b* and FIG. 7*c*, the different values of the rotational speed are labelled $N_{R,-}$ and $N_{R,0}$ and $N_{R+}$, wherein $N_{R,0}$ corresponds to a nominal rotational speed of the rotor (100%), and $N_{R,+}$ corresponds to 115% of this nominal rotational speed, and $N_{R,-}$ corresponds to 90% of the nominal rotational speed. In FIG. 7*a*-7*c*, the rotational speed value $N_{R,-}$ is shown as a dashed line, the rotational speed value $N_{R,0}$ as a solid line, and the rotational speed value $N_{R,+}$ as a dotted line. The thrust is shown in FIG. 7*a* as a percentage of the maximum achievable thrust of the rotor. In FIG. 7*a*-7*c*, the angle of attack of the blade is given in angular degrees (°).

The thrust (see FIG. 7*a*) can be measured, for example, by means of a suitable force measuring device, which is provided in contact with the rotor or its shroud and detects a mechanical force generated by the rotor.

At the same time or in a subsequent step, the sound value (ordinate axis in FIGS. 7*b*, 7*c*) is also measured as a function of the varying angle of attack of the blade (abscissa axis in FIGS. 7*b*, 7*c*) at a constant rotational speed. The diagram in FIG. 7*b* is based on a measured tonality of the sound emission of the tail rotor 5 as a sound index, while in the diagram in FIG. 7*c* a total sound level was measured as a sound index. The tonality (FIG. 7*b*) and the total sound level (FIG. 7*c*) are each given in dB in the present example. The tonality can be defined in particular as the difference between a peak sound level and the broadband noise level, wherein the peak sound level is determined at a predetermined frequency of the measured frequency spectrum or an arithmetic mean of the differences between several peak sound levels at predetermined frequencies and the broadband noise level. For example, the predetermined frequencies of the peak sound levels can be defined by one or more characteristic blade passing frequencies of the rotor blades. These characteristic blade passing frequencies result, among other things, from the number of rotor blades, their angular distances from each other and the rotor speed. In particular, the arithmetic averaging can be limited to a predetermined frequency range, for example between 300 Hz and 3000 Hz.

The pairs of operating values defined in the first step 51 and the sound indices assigned in the second step 52 are then stored in a third step 53 of FIG. 5 by a memory unit 103, for example on a storage medium or a data carrier of the control data provision unit 100. In the example of FIGS. 7*a* to 7*c*, for example, the diagrams themselves can be stored, or the data on which the diagrams are based.

Subsequently, one pair of operating parameter values is selected from the plurality of data stored in the third step 53 for a specified thrust value of the tail rotor 5. This selection is made on the basis of the determined and stored sound indices. For example, the operating parameter value pair for which the smallest sound index was determined can be selected for a specific thrust value.

This is explained again below using the example of the diagrams in FIGS. 7*a* to 7*c*. In FIG. 7*a*, four different thrust values $S_1$, $S_2$, $S_3$ and $S_4$ are shown, wherein each of the thrust values for each of the set rotational speeds is achieved by a specific angle of attack of the blade, each marked in FIG. 7*a* by points lying on the measurement curves (intersection of the respective thrust value with the measurement curve assigned to the respective rotational speed value). By comparison with the diagrams of FIGS. 7*b* and 7*c*, it is then possible to determine for which of the angle of attack of the blade or pairs of angle of attack of the blade and rotational speed (pairs of operating parameter values) the smallest tonality of the sound emission of the tail rotor 5 (for FIG. 7 *b*) or the smallest total sound level (for FIG. 7*c*) was measured, which is shown in FIGS. 7*b* and 7*c* as a point labelled with the respective thrust value $S_1$, $S_2$, $S_3$ and $S_4$. In other words, the points $S_1$, $S_2$, $S_3$ and $S_4$ in FIGS. 7*b* and 7*c* each indicate the pairs of angle of attack of the blade and rotational speed (pairs of operating parameter values) that have the smallest value of tonality (FIG. 7*b*) or total sound level (FIG. 7*c*).

Subsequently, in a fourth step 54, an output unit 104 outputs control data for controlling the tail rotor 5 during flight operation of the helicopter 1, which specify the respective pair of operating parameter values selected in step 53 for controlling the tail rotor 5 for a thrust value of the tail rotor 5 to be achieved. In the example of FIGS. 7 *a*-7*c*, for example, the pair of operating parameter values can be output for which the tonality of the sound emission of the tail rotor 5 is minimized for the respective thrust value (for FIG. 7*b*) or the total sound level is minimized (for FIG. 7*c*).

The control data output can be stored in the form of a table, for example. For this purpose, different sound indices and corresponding pairs of operating parameter values can also be stored to define different operating modes of the helicopter 1. FIG. 8 shows a purely exemplary table based on the measurements described with reference to FIGS. 7*a*-7*c*. For predetermined thrust values $S_1$, $S_2$, $S_3$, $S_4$ . . . the respective pairs of operating parameter values of the rotational speed N and the angle of attack ¢ of the blade are determined in the steps 51 to 54 described above, with which a reduction in the tonality of the sound emission is achieved ("low tonality" mode) or a reduction in the total sound level is achieved ("low total sound level" mode) and, if necessary, other criteria of the sound characteristics are met. This defines different operating modes for the tail rotor 5, in FIG. 8, for example, an operating mode for reducing the tonality of the sound emission and an operating mode for reducing the total sound level. In other words, the table in FIG. 8 lists the pairs of angel of attack of the blade and rotational speed (pairs of operating parameter values) determined by means of the points $S_1$, $S_2$, $S_3$ and $S_4$ with reference to FIG. 7*b* and FIG. 7*c*.

During flight operation of the helicopter 1, the tail rotor 5 can be controlled according to the values stored in the table in FIG. 8, i.e. for a targeted thrust value of the tail rotor depending on the operating mode according to the pair of operating parameter values stored for it in the table. Here, an operating mode can be selected by a pilot or automatically, e.g. by the control unit 8.

For example, when the helicopter 1 is hovering, i.e. in a state of the helicopter in which it remains in a substantially unchanged horizontal and vertical position, increased blade loads of the tail rotor 5 are required, which is usually accompanied by a dominance of the tonal sound component. In addition, the helicopter remains above the same ground position for a long time when hovering, so that a reduction in sound emission is particularly desirable here. When hovering, the tail rotor 5 is therefore preferably operated according to the "low tonality" operating mode described above.

In the method described above with reference to FIG. 5, it is not necessary to determine all the required values, i.e. in particular thrust values, pairs of operating parameter values and sound indices by measurements. Rather, it is also possible to determine only some of these values by measurement and to generate further values by interpolation and/or numerical simulation. This can reduce the amount of measurement work required.

For example, as an alternative to the measurement described above based on continuously set angles of attack of the blade, the curves shown in FIGS. 7*a*-7*c* can also be determined on the basis of several discrete values of the angle of attack of the blade and corresponding thrust values and sound indices, wherein the continuous functions shown in the figures are generated from the discrete measured values by interpolation.

Additional values can also be generated using a numerical simulation. A numerical simulation can, for example, include the simulation of the flow field of the tail rotor 5 during operation and a calculation of the acoustic sources on which this flow field is based (numerical simulation of aerodynamics, also known as computational fluid dynamics, cfd). The numerical flow simulation can be supplemented by a numerical simulation of the acoustics (computational aeroacoustics, caa), which numerically calculates the overall system of the shrouded tail rotor 5, in particular the effects of the hollow structure 25 of the shroud and/or a liner provided on the shroud, and the flow around it. Examples of such numerical simulations are described in the documents mentioned at the beginning.

In the method described above with reference to FIG. 5, the respective operating parameters for controlling the tail rotor 5 are selected such that an improvement can be achieved with regard to the sound emission emitted during operation of the helicopter 1, i.e. during flight. Here, the method can be supplemented taking into account further effects or optimization points to be achieved, i.e. the choice of the respective operating parameters for controlling the tail rotor 5 can be changed

The invention claimed is:

1. A method for controlling at least one rotor of a flight vehicle, wherein the at least one rotor is configured to compensate for or at least reduce a torque acting on the flight vehicle, the at least one rotor is provided with a shroud, and wherein a rotational speed of the at least one rotor and an angle of attack of at least one rotor blade of the at least one rotor are adjustable for the at least one rotor, wherein the method comprises the following steps:

(a) defining at least a first pair of operating parameter values that includes a rotational speed and an angle of attack for the at least one rotor to achieve a specific thrust value, and at least a second pair of operating parameter values that includes a rotational speed and an angle of attack different than that of the first pair of operating parameter values, and which second pair of operating parameter values achieves the same thrust value as the first pair of operating parameter values, and controlling the at least one rotor to operate at the first pair of operating parameter values and subsequently to operate at the second pair of operating parameter values, (b) determining a first sound index when the at least one rotor operates at the first pair of operating parameter values and determining a second sound index when the at least one rotor operates at the second pair of operating parameter values, wherein the determining comprises measuring a sound value of the at least one rotor in a test arrangement, (c) storing the first and second sound indices with assignment to the respective pair of operating parameter values, and (d) controlling the at least one rotor during operation of the flight vehicle, with reference to the assignment stored in step c) and as a function of the at least first or second sound index to be selectively achieved, in accordance with the first pair of operating parameter values or the second pair of operating parameter values.

2. The method of claim 1, wherein steps a) to c) are carried out for more than two pairs of operating parameter values and corresponding sound indices.

3. The method of claim 1, wherein steps a) to c) are carried out for several thrust values to be achieved.

4. The method of claim 1, wherein the assignment in step c) comprises a graphical and/or tabular representation of the sound indices as a function of the rotational speeds and/or the angles of attack of the at least one rotor and/or the thrust values achieved thereby.

5. The method of claim 1, wherein the assignment stored in step c) is supplemented by further sound indices and/or pairs of operating parameter values and/or thrust values, which are determined in a numerical simulation and/or by interpolation.

6. The method of claim 1, wherein in step d) the sound index on which the control of the at least one rotor is based is selected such that a reduction in a sound emission of the at least one rotor is achieved.

7. The method of claim 1, wherein the sound indices comprise a tonality and/or a total level of a sound emission of the at least one rotor.

8. The method of claim 1, wherein the shroud of the at least one rotor is formed by a circumferential hollow structure with respect to an axis of rotation of the at least one rotor, the hollow structure having on its circumferential surface facing the at least one rotor a region that is gas-permeable at least in sections thereof, the hollow structure being configured such that acoustic waves of at least one frequency penetrating into the hollow structure through the gas-permeable region are at least partially absorbed by the hollow structure.

9. The method of claim 1, wherein the measurement of the sound value of the at least one rotor in step (b) is carried out on a test station, wherein at least one measuring device for detecting the sound value is arranged at a predetermined position in relation to a position of the at least one rotor in the test station.

10. The method of claim 1, wherein the flight vehicle is designed as a helicopter and the at least one rotor is a secondary rotor configured for torque compensation and control about a yaw axis.

11. The method of claim 10, wherein the helicopter comprises a drive, which is configured to set the secondary rotor in rotation according to a predetermined rotational speed.

12. The method of claim 1, wherein the at least one rotor is a first rotor of the flight vehicle and the flight vehicle comprises at least a second rotor configured to compensate for or at least reduce a torque acting on the flight vehicle, wherein the second rotor is provided with a second shroud, and a rotational speed of the second rotor and an angle of attack of at least one rotor blade of the second rotor are adjustable for the second rotor independently of the first rotor, and wherein steps a) to d) are carried out separately for the first and the at least second rotor or by measuring a total sound value of the at least two rotors.

13. A flight vehicle, comprising a control unit which controls the at least one rotor during operation of the flight vehicle at least temporarily according to step (d) of the method of claim 1.

14. The method of claim 10, wherein the secondary rotor is a tail rotor of the helicopter.

15. The method of claim 11, wherein the drive is an electric motor.

16. A control data provision unit for a flight vehicle having at least one rotor, wherein the at least one rotor is configured to compensate for or at least reduce a torque acting on the flight vehicle, the at least one rotor is provided with a shroud, and wherein a rotational speed of the at least one rotor and an angle of attack of at least one rotor blade of the at least one rotor are adjustable for the at least one rotor, wherein the control data provision unit comprises:

(a) a defining unit for defining at least a first pair of operating parameter values that includes a rotational speed and an angle of attack for the at least one rotor to achieve a specific thrust value, and at least a second pair of operating parameter values that includes a rotational speed and an angle of attack different than that of the first pair of operating parameter values, and which second pair of operating parameter values achieves the same thrust value as the first pair of operating parameter values, and controlling the at least one rotor to operate at the first pair of operating parameter values and subsequently to operate at the second pair of operating parameter values, (b) a determination unit for determining a first sound index when the at least one rotor operates at the first pair of operating parameter values and determining a second sound index when the at least one rotor operates at the second pair of operating parameter values, wherein the determining comprises measuring a sound value of the at least one rotor in a test arrangement, (c) a memory unit for storing the first and second sound indices with assignment to the respective pair of operating parameter values, and (d) an output unit for outputting control data for controlling the at least one rotor during operation of the flight vehicle, the control data specifying, with reference to the assignment stored in the memory unit and as a function of the at least first or second sound index to be selectively achieved, the control of the at least one rotor in accordance with the first pair of operating parameter values or the second pair of operating parameter values.

17. A flight vehicle, comprising a control unit which controls the at least one rotor during operation of the flight vehicle at least temporarily using the control data provided by the control data provision unit of claim 16.

18. The flight vehicle of claim 17, wherein the control of the at least one rotor is carried out at least during hover flight of the flight vehicle.

* * * * *